(12) United States Patent
Zhou et al.

(10) Patent No.: US 10,957,092 B2
(45) Date of Patent: Mar. 23, 2021

(54) METHOD AND APPARATUS FOR DISTINGUISHING BETWEEN OBJECTS

(71) Applicant: TENCENT TECHNOLOGY (SHENZHEN) COMPANY LIMITED, Shenzhen (CN)

(72) Inventors: Jinyuan Zhou, Shenzhen (CN); Li Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 268 days.

(21) Appl. No.: 16/000,550

(22) Filed: Jun. 5, 2018

(65) Prior Publication Data

US 2018/0285674 A1 Oct. 4, 2018

Related U.S. Application Data

(63) Continuation of application No. PCT/CN2016/107119, filed on Nov. 24, 2016.

(30) Foreign Application Priority Data

Feb. 26, 2016 (CN) .......................... 201610109796.3

(51) Int. Cl.
*G06T 15/00* (2011.01)
*A63F 13/52* (2014.01)
(Continued)

(52) U.S. Cl.
CPC .............. *G06T 15/00* (2013.01); *A63F 13/52* (2014.09); *G06T 11/001* (2013.01); *G06T 15/50* (2013.01)

(58) Field of Classification Search
CPC ....... G06T 15/00; G06T 11/001; G06T 15/50; G06T 15/205; G06T 15/04; G06T 11/40; G06T 5/001; A63F 13/52
(Continued)

(56) References Cited

U.S. PATENT DOCUMENTS

2014/0226859 A1* 8/2014 Bharath ............... G06K 9/6202
382/103

FOREIGN PATENT DOCUMENTS

| CN | 102103753 A | 6/2011 |
| CN | 102663743 A | 9/2012 |

(Continued)

OTHER PUBLICATIONS

Korean Intellectual Property Office (KIPO) Office Action 1 for 20187007925 and Translation dated Sep. 11, 2019 12 Pages.
(Continued)

*Primary Examiner* — Amandeep Saini
(74) *Attorney, Agent, or Firm* — Anova Law Group, PLLC

(57) ABSTRACT

The present disclosure discloses a method and an apparatus for distinguishing objects. The method includes: obtaining a plurality of object groups displayed in an image, each object group including at least one target object, and a same resource being configured for target objects in different object groups; setting different mark values for the plurality of object groups, target objects in a same object group having a same mark value; and separately performing pixel correction on pixels of the target objects in each object group according to the mark value of each object group, pixels of the target objects having different mark values being corrected to have different display attributes.

14 Claims, 7 Drawing Sheets

(51) Int. Cl.
*G06T 15/50* (2011.01)
*G06T 11/00* (2006.01)

(58) Field of Classification Search
USPC .......................................................... 382/103
See application file for complete search history.

(56) References Cited

FOREIGN PATENT DOCUMENTS

| CN | 103150720 A | 6/2013 |
|---|---|---|
| CN | 103208190 A | 7/2013 |
| CN | 103390164 A | 11/2013 |
| CN | 104350510 A | 2/2015 |
| CN | 105678834 A | 6/2016 |
| EP | 1391847 A1 | 2/2004 |
| JP | 200808839 A | 1/2008 |

OTHER PUBLICATIONS

None, "Draw Call Batching", Unity—Manual, URL: https://web.archive.org/web/20151220034416/https://docs.unity3d.com/Manual/DrawCallBatching.html, Dec. 20, 2015, [retrieved on Sep. 11, 2019] 3 Pages.

The European Patent Office (EPO) The Extended European Search Report for 16891260.8 dated Oct. 8, 2018 11 Pages.

Gilberto Rosado, "Chapter 27. Motion Blur as a Post-Processing Effect" In: "GPU Gems 3", Aug. 3, 2007 (Aug. 3, 2007), Addison-Wesley, US, XP055508391, ISBN: 978-0-321-51526-1, Sec. 27.1, 27.5 9 Pages.

Matthias Haringer et al: "Effect based scene manipulation for multimodal VR systems", Virtual Reality Conference (VR), 2010 IEEE, IEEE, Piscataway, NJ, USA, Mar. 20, 2010 (Mar. 20, 2010), pp. 43-46, XP031656126, ISBN: 978-1-4244-6237-7, figure 2, Sec.1, Sec 5.1 4 Pages.

None, "Unity—Manual: Draw Call Batching", Unity Technologies, Jan. 1, 2015 (Jan. 1, 2015), XP055508562, Retrieved from the Internet: URL: https://docs.unity3d.com/510/Documentation/Manual/DrawCallBatching.html [retrieved on Sep. 20, 2018], p. 1 3 Pages.

Dirk Reiners, "Scene Graph Rendering", Mar. 5, 2002 (Mar. 5, 2002), XP055508566, Retrieved from the Internet: URL: https://pdfs.semanticscholar.org/8b1c/c770bbe6abfb0534b368caad58bdb94b102.pdf [retrieved on Sep. 20, 2018], Sec. 11 18 Pages.

Milan Magdics et al: "Post-processing NPR effects for video games", Proceedings of the 12th ACM SIGGRAPH International Conference on Virtual-Reality Continuum and Its Applications in Industry, VRCAI '13, Jan. 1, 2013 (Jan. 1, 2013), pp. 147-156, XP055508371, New York, New York, USA DOI: 10.1145/2534329.2534348 ISBN: 978-1-4503-2590-5, abstract, Sec. 5.4.3-5.5 12 Pages.

The State Intellectual Property Office of the People's Republic of China (SIPO) Office Action 1 for 201610109796.3 dated Mar. 25, 2019 9 Pages (including translation).

The World Intellectual Property Organization (WIPO) International Search Report for PCT/CN2016/107119 dated Feb. 24, 2017 5 Pages (including translation).

\* cited by examiner

METHOD AND APPARATUS FOR DISTINGUISHING BETWEEN OBJECTS

CROSS-REFERENCES TO RELATED APPLICATIONS

This application is a continuation application of PCT Patent Application No. PCT/CN2016/107119, filed on Nov. 24, 2016, which claims priority to Chinese Patent Application No. 2016101097963, filed on Feb. 26, 2016, all of which are incorporated by reference in entirety.

FIELD OF THE TECHNOLOGY

The present disclosure relates to the field of image processing and, more specifically, to a method and an apparatus for distinguishing objects.

BACKGROUND OF THE DISCLOSURE

In existing technology, when a plurality of objects that simultaneously appear in an image need to be distinguished from each other, a commonly used method is to configure different resources for different object groups, so that one or more different objects in different object groups have different display features, thereby facilitating recognition by users. For example, in the game Counter-Strike, during shooting, a user needs to distinguish whether target objects displayed in a display area are teammates or enemies. After the user chooses to be a terrorist or a counter-terrorist, the game prompts the user to choose corresponding clothes or equips the user with clothes corresponding to the chosen role. It can be learned that during gaming, players with two different roles wear different clothes. The user determines whether objects are teammates or enemies according to the clothes on the objects that appear in the display area and further determines whether to shoot the objects.

However, in the process of distinguishing objects in an image by using the foregoing method, the following problems exist:

(1) When the existing technology is used, a user distinguishes between target objects, resulting in that objects in different object groups cannot use a same set of resources, and consequently, the reusability of resources is relatively low. When objects in a plurality of object groups all need to use a same set of resources, it is difficult to achieve coordination.

(2) When a target object appears at a relatively far location in the view angle of a user, the user can hardly recognize specific attributes of the target object.

Thus, there needs an effective solution to the problem of low resource reusability in the existing technology due to that different resources need to be configured for different target objects in an image to distinguish the different target objects.

SUMMARY

Embodiments of the present disclosure provide a method and an apparatus for distinguishing between objects, to resolve at least the technical problem of low resource reusability in the existing technology due to that different resources need to be configured for different target objects in an image to distinguish between the different target objects.

According to an aspect of the present disclosure, a method for distinguishing between objects is provided. The method includes: obtaining a plurality of object groups displayed in an image, each object group including at least one target object, and a same resource being configured for target objects in different object groups; setting different mark values for the plurality of object groups, target objects in a same object group having a same mark value; and separately performing pixel correction on pixels of the target objects in each object group according to the mark value of each object group, pixels of the target objects having different mark values being corrected to have different display attributes.

According to another aspect of the present disclosure, a non-transitory computer-readable storage medium is provided. The non-transitory computer-readable storage medium contains computer-executable instructions for, when executed by one or more processors, performing a method for distinguishing objects. The method includes: obtaining a plurality of object groups displayed in an image, each object group including at least one target object, and a same resource being configured for target objects in different object groups; setting different mark values for the plurality of object groups, target objects in a same object group having a same mark value; and separately performing pixel correction on pixels of the target objects in each object group according to the mark value of each object group, pixels of the target objects having different mark values being corrected to have different display attributes.

According to another aspect of the present disclosure, an apparatus for distinguishing objects is provided. The apparatus includes a memory storing instructions, and a processor coupled to the memory. When executing the instructions, the processor is configured for: obtaining a plurality of object groups displayed in an image, each object group including at least one target object, and a same resource being configured for target objects in different object groups; setting different mark values for the plurality of object groups, target objects in a same object group having a same mark value; and separately performing pixel correction on pixels of the target objects in each object group according to the mark value of each object group, pixels of the target objects having different mark values being corrected to have different display attributes.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding of the present disclosure, and constitute a part of the present application. Illustrative embodiments and descriptions thereof of the present disclosure are used to explain the present disclosure, and do not constitute any inappropriate limitation to the present disclosure. In the figures.

DETAILED DESCRIPTION OF THE DISCLOSURE

Figure 1:
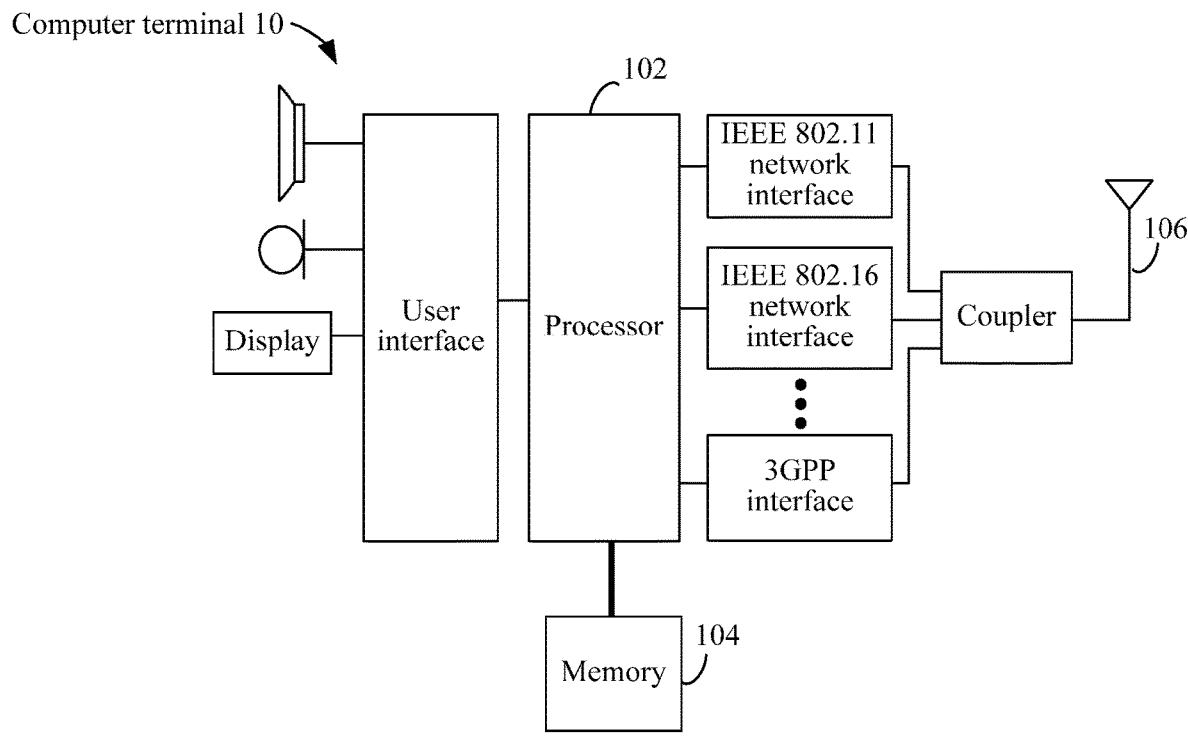
FIG. 1 illustrates a structural block diagram of hardware of a computer terminal of a method for distinguishing objects according to an embodiment of the present application.

To enable a person skilled in the art to better understand the solutions of the present disclosure, the following clearly and completely describes the technical solutions in the embodiments of the present disclosure with reference to the accompanying drawings in the embodiments of the present disclosure. Apparently, the described embodiments are some rather than all of the embodiments of the present disclosure. Other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", and so on are intended to distinguish between similar objects rather than to indicate a specific order or a time order. It should be understood that such used data can be exchanged with each other in appropriate cases, so that the embodiments of the present disclosure described herein can be implemented in a sequence other than the sequences shown in the figures or described herein. Moreover, the terms "include", "have" and any other variants mean to cover the non-exclusive inclusion. For example, in the context of a process, method, system, product or device that includes a series of steps or units, the process, method, system, product or device is not necessarily limited to the clearly listed steps or units. Instead, includes other steps or units not specified clearly, or may include inherent steps or units of the process, method, product, or device.

Certain terms that appear in the embodiments of the present disclosure are explained as following.

Post-processing: Post-processing is a stage in a computer graphics pipeline, and a process of processing an image that is outputted after the rendering of a three-dimensional scene is completed.

Pipeline: The term pipeline is used to describe a process, which may include two or more unique phases or steps.

Render target texture: In the field of three-dimensional computer graphics, the render target texture is a graphics processing unit (GPU), and is a technology that allows rendering of a three-dimensional scene into an intermediate memory buffer.

Color cast: The color cast is a difference between a displayed color and a real color, and is caused when one or more colors are weak or strong. The color cast is common in the use of an instrument such as a liquid crystal display, a camera or a printer.

Channel: A grayscale image that stores different types of information in a digital image. One image may have tens of channels at most. Commonly used RGB and Lab images have three channels by default, whereas a CMYK image has four channels by default.

Alpha channel: The Alpha channel is an 8-bit grayscale channel, which uses 256 gray levels to record transparency information in an image and define transparent, opaque, and semitransparent areas, where black represents transparency, white represents opacity, and gray represents semitransparency.

Bloom: A computer graphics effect in video games, demos, and high dynamic range rendering to reproduce an imaging artifact of real-world cameras. The effect produces fringes or feathers of light extending from the borders of objects with high brightness in an image, to blur details of the image.

According to an embodiment of the present disclosure, a method for distinguishing objects is provided. It should be noted that steps shown in the flowchart of the accompanying drawing may be performed, for example, in a computer system storing a group of computer executable instructions. In addition, although a logic sequence is shown in the flowchart, in some cases, the shown or described steps may be performed in a sequence different from that described herein.

The method embodiment of the present application may be executed in a mobile terminal, a computer terminal, or a similar computing apparatus. For example, the method embodiment is operated on a computer terminal. FIG. 1 is a structural block diagram of hardware of a computer terminal performing a method for distinguishing objects according to an embodiment of the present application. As shown in FIG. 1, a computer terminal 10 may include one or more (only one is shown in the figure) processors 102 (the processor 102 may include, but not limited to a processing apparatus such as a microprocessor MCU or a programmable logic device FPGA), a memory 104 configured to store data, and a transmission apparatus 106 configured to implement a communication function. A person of ordinary skill in the art may understand that the structure shown in FIG. 1 is only for illustrative purposes, and is not intended to be limiting. For example, the computer terminal 10 may include more or fewer components than those shown in FIG. 1, or have a configuration different from that shown in FIG. 1.

The memory 104 may be configured to store a software program and module of application software, for example, program instructions/modules corresponding to the method for distinguishing objects in this embodiment of the present disclosure. The processor 102 runs the software program and module stored in the memory 104, to implement various functional applications and data processing, that is, implement the foregoing method for distinguishing objects. The memory 104 may include a high-speed random-access memory (RAM), and may also include a nonvolatile memory such as one or more magnetic storage devices, flash memories, or other nonvolatile solid-state memories. In some examples, the memory 104 may further include memories remotely disposed relative to the processor 102, and these remote memories may be connected to the computer terminal 10 through a network. Examples of the network include, but not limited to, the Internet, an intranet, a local area network, a mobile communications network, and a combination thereof.

The transmission apparatus 106 is configured to receive or send data through a network. A specific example of the network may include a wireless network provided by a communication provider of the computer terminal 10. In an example, the transmission apparatus 106 includes a network adaptor or a network interface controller (NIC), which may be connected to another network device through a base station to communicate with the Internet. In an example, the transmission apparatus 106 may be a radio frequency (RF) module, which is configured to communicate with the Internet in a wireless manner.

Figure 2:
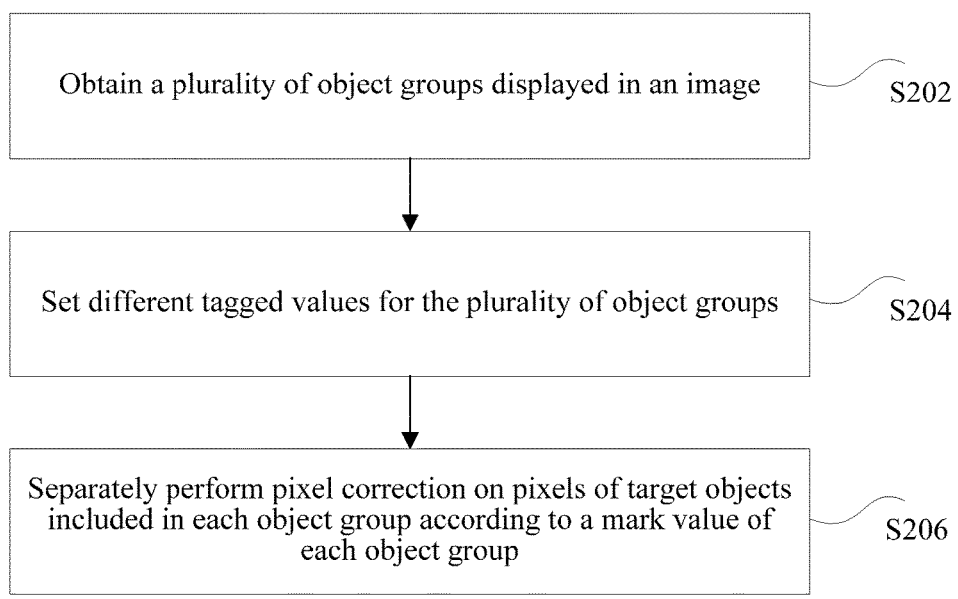
FIG. 2 illustrates a flowchart of a method for distinguishing objects according to an embodiment of the present application.

According to an embodiment of the present disclosure, a method for distinguishing objects is provided. As shown in FIG. 2, the method includes the following.

S202: Obtaining a plurality of object groups displayed in an image, each object group including at least one target object, and it is allowable for same resource to be configured for target objects in different object groups.

In an embodiment, shooting games are used as examples. In common shooting games, a user needs to choose a group to determine teammates and enemies of the user. For example, in the game Counter-Strike, a user may choose to play as a terrorist or a counter-terrorist. In the game CrossFire, a user may choose to play as a Black List mercenary or a Global Risk mercenary. In a same game, users that choose a same role are objects that belong to a same object group, and one object group includes at least one object.

It should be noted that in the foregoing embodiment of the present application, it is allowed to configure a same resource for objects in different object groups.

In an embodiment, Black List and Global Risk in CrossFire are used as an example. In the existing technology, a Black List mercenary (i.e., an object in the object group of Black List mercenaries) and a Global Risk mercenary (i.e., an object in the object group of Global Risk mercenaries) cannot wear the same cloth. The reason is that, in the existing technology, when a user plays CrossFire, the user determines whether other objects in the game are teammates or enemies of the user according to different outfits of the Black List mercenaries and the Global Risk mercenaries. To the contrary, in the present disclosure, different groups in the game can choose same clothes without affecting the distinguishing function between teammates and enemies by users.

S204: Setting different mark values for the plurality of object groups, where all target objects included in each object group having a same mark value or tagged value.

For example, the target objects are Black List and Global Risk in CrossFire. In the obtained objects of Black List mercenaries and Global Risk mercenaries, characters in the game are marked according to the characteristics of the groups. In this example, there are three object groups, that is, an object group of teammates, an object group of enemies, and an object group of the user. For example, in the foregoing example, teammates may be marked as 1, the enemies may be marked as 2, and the user may be marked as 0.

S206: Separately performing pixel correction on pixels of the target objects included in each object group according to the mark value of each object group, pixels of the target objects having different mark values are corrected to have different display attributes.

It should be noted that any one of the object groups includes at least one target object, and different object groups have different mark values, but objects in a same object group have a same mark value. By applying the foregoing method, the technical objective of distinguishing a plurality of target objects when a same resource is configured for the plurality of target objects can be achieved.

It should further be noted that there may be two or more object groups that are distinguished from each other by using the method according to the foregoing embodiment, but the number of object groups is not limited thereto, and any number of object groups can be distinguished from each other by using the disclosed method.

Figure 3A:
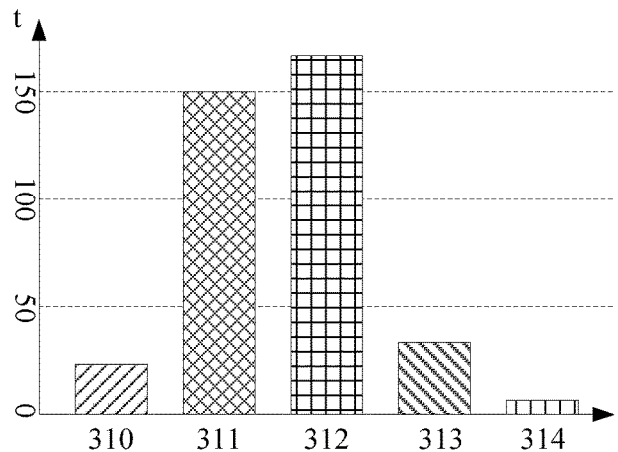
FIG. 3A illustrates a bar chart of processing time of super-post-processing according to the existing technology.
Figure 3B:
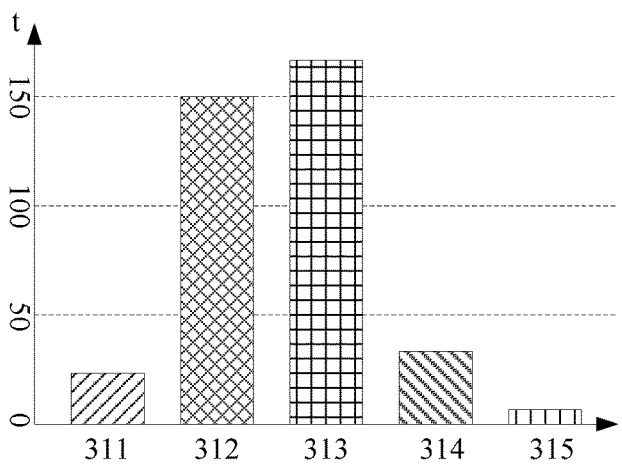
FIG. 3B illustrates a bar chart of processing time of super-post-processing according to an embodiment of the present application.

It should be noted that the process of pixel correction on the pixels of the target objects is performed in super-post-processing of a post-processing phase in image processing. The rendering efficiency is greatly improved by correcting the pixels in the post-processing. FIG. 3A is a bar chart of processing time of super-post-processing according to the existing technology. FIG. 3B is a bar chart of processing time of super-post-processing according to an embodiment of the present disclosure. In the present disclosure, the step of performing pixel correction on the pixels of the target objects is added to the super-post-processing phase.

With reference to FIG. 3A and FIG. 3B, the rendering time including the time for performing pixel correction on the pixels of the target objects in the present disclosure slightly increases relative to the rendering time in the existing technology, but the increase is not obvious. By using Erg311 (indicating that this image includes 311 objects) as an example, the rendering time is 148.0 us. In the existing technology, the rendering time of Erg312 (indicating that this image includes 312 objects) is 155.0 us. The rendering time in the present disclosure is only 4.7% longer than the rendering time of the existing technology. Therefore, the solution provided in the present disclosure can maintain the original rendering efficiency while achieving the objective of distinguishing objects.

Figure 4A:
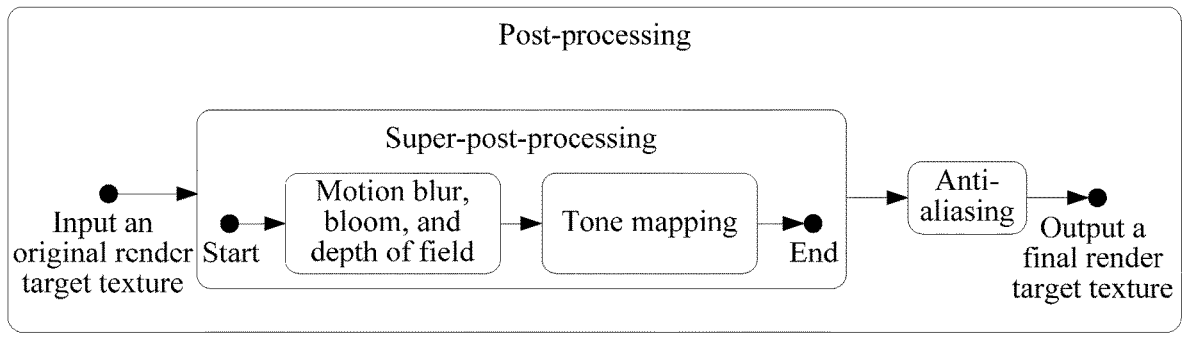
FIG. 4A illustrates a flowchart of processing of a post-processing phase according to the existing technology.
Figure 4B:
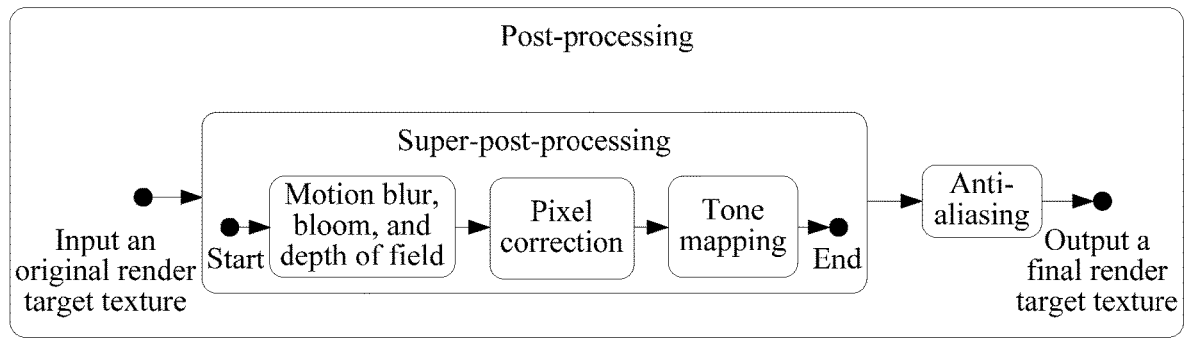
FIG. 4B illustrates a flowchart of processing of a post-processing phase capable of distinguishing objects according to an embodiment of the present application.

FIG. 4A is a flowchart of processing of a post-processing phase according to the existing technology. FIG. 4B is a flowchart of processing of an optional post-processing phase capable of distinguishing objects according to an embodiment of the present disclosure. With reference to FIG. 4A and FIG. 4B, it can be seen that the step of pixel correction is added only to the super-post-processing phase of the present disclosure.

In the foregoing steps of this embodiment of the present disclosure, a plurality of object groups displayed in an image are obtained, each object group includes at least one target object, and a same resource can be configured to target objects in different object groups. Further, different mark values are set for the plurality of object groups, target objects included in each object group have a same mark value, and pixel correction is separately performed on pixels of the target objects included in each object group according to a mark value of each object group, so as to achieve the technical objective of still being capable of distinguishing objects when a plurality of different object groups use a same resource, thereby achieving the technical effect of improving the resource reusability, and further resolving the technical problem of low resource reusability in the existing technology due to that different resources need to be configured for different target objects in an image to distinguish the different target objects.

In an embodiment provided in the present disclosure, S204 of setting different mark values for the plurality of object groups includes:

S2041: Constructing a mapping relationship between the plurality of object groups and a plurality of different mark values.

It should be noted that a mark value corresponding to each object group is not limited to any value range, and the objective is to ensure that mark values of the plurality of object groups are different.

For example, the target objects are Black List and Global Risk in CrossFire. In this example, there are three object groups, that is, an object group of a user, an object group of teammates of the user, and an object group of enemies of the user. Therefore, a mapping relationship between the object groups and mark values is constructed corresponding to the three object groups. The mapping relationship is used only for distinguishing different object groups. Therefore, specific mark values are not limited, provided that mark values corresponding to different object groups are different. For example, mark values corresponding to the user, the teammates of the user, and the enemies of the user may be respectively 0, 1, and 2.

After the mapping relationship between the plurality of object groups and the mark values is constructed, to enable each object in the object groups to be distinguished from other objects, each object included in the object groups needs to be marked.

S2043: Setting a corresponding mark value for each object in the plurality of object groups by using the mapping relationship, where the mark value of each object is set to a mark value corresponding to an object group to which each object belongs.

S2045: Marking a plurality of pixels included in each object by using the mark value of each object.

For example, the target objects are Black List and Global Risk in CrossFire. When each target object included in each object group has a mark value, the objective of setting a mark value for a target object is to distinguish target objects of different object groups, and the distinguishing method used in the present disclosure is to perform pixel correction on pixels of the target objects. Therefore, each pixel included in each target object needs to have a mark value the same as that of the target object, so that different objects can be distinguished from each other when pixel correction is performed on the target objects.

In an embodiment provided in the present disclosure, after S204 of setting different mark values for the plurality of object groups, the method further includes:

S2047: Rendering the target objects into a first render target texture, where the render target texture has a plurality of channels.

For example, the target objects are Black List and Global Risk in CrossFire. The target objects, that is, bodies of the roles, are rendered into a plurality of channels of a first render target texture $RT_0$.

It should be noted that the first render target texture may include three channels of RBG, or may include four channels of CMYK, but the present disclosure is not limited thereto.

S2049: Normalizing mark values of pixels of the target objects, to obtain standard mark values.

It should be noted that, although the standard mark values obtained after normalization of the mark values are different from the original mark values, the standard mark values are still different from each other after normalization, so that objects can be distinguished from each other.

For example, the target objects are Black List and Global Risk in CrossFire. When mark values corresponding to the user, teammates of the user, and enemies of the user are respectively 0, 1, and 2, the standard mark values after normalization may be respectively 0, 0.5, and 1.

S2051: Inputting the standard mark values obtained by means of normalization into a second render target texture, where the second render target texture has a plurality of channels, and the different standard mark values are inputted into the plurality of channels of the second render target texture that have different channel values.

In the foregoing step, the standard mark values corresponding to the target objects are inputted into Alpha channel of a second render target texture $RT_1$. The second render target texture still has a plurality of channels. A standard mark value of one target object occupies only one channel.

It should be noted that channel values of channels into which different standard mark values are inputted are different. When a channel value is larger, the presented color is closer to white. When a channel value is smaller, the presented color is closer to gray. Therefore, an attribute of a target object, that is, an object group to which the target object belongs, can be obtained by using the second render target texture.

It should further be noted that the channels included in the second render target texture have only standard eigenvalues of the target objects. Therefore, the second render target texture outputs a profile that is of a target object and has a particular grayscale, but the target object is not included.

In an embodiment provided in the present disclosure, S206 of separately performing pixel correction on pixels of the target objects included in each object group according to a mark value of each object group includes: correcting the pixels of the target objects having different mark values into different colors, where the correcting the pixels of the target objects having different mark values into different colors includes the following.

S2061: Obtaining the standard mark values corresponding to the pixels of the target objects.

S2063: Adjusting display intensities of a plurality of primary colors that form a color of each pixel in the target objects according to the standard mark values corresponding to the pixels of the target objects, to correct the color of each pixel in the target objects, where pixels of the target objects having a same mark value are corrected into corresponding colors.

In an embodiment, for example, a color of a pixel included in a target object is formed by colors of three channels of RGB. When intensities of the colors of the RGB channels change, the displayed color of the pixel of the target object is changed, so as to change the displayed color of the target object. For example, an RGB value of one pixel of the target object is (58, 110, 165). In this case, the displayed color of the pixel is blue. When the RGB value of the pixel is corrected to be (248, 24, 237), the displayed color of the pixel is corrected to be rose.

It should be noted that colors of target objects having a same mark value are different. Moreover, colors of a plurality of pixels of one target object are also different. Therefore, when pixel correction is performed on pixels of target objects, the pixels of the targets objects are not corrected to have a same RGB value. Instead, RGB values of pixels having a same standard mark value are uniformly adjusted, and the adjustment intensities are the same. To enable the pixels having a same standard mark value to obtain a same adjustment intensity during correction, an adjustment constant needs to be introduced.

In an embodiment provided in the present disclosure, S2063 of adjusting display intensities of a plurality of primary colors that form a color of each pixel in the target objects according to the standard mark values corresponding to the pixels of the target objects of S206 includes the following.

S20631: Calculating a corrected pixel color of each pixel in the target objects by using the following formula, $$Color_{dest} = Color_{scr} * Color_{trans},$$

where $Color_{dest}$ is used to represent the corrected pixel color of a pixel of the target objects, $Color_{scr}$ used to represent an original pixel color of a pixel of the target objects, $Color_{trans}$ is used to represent a correction constant, and the correction constant is used to adjust the display intensities of the plurality of primary colors that form the color of each pixel in the target objects.

The correction constant is used to represent correction amplitude for correcting a color. It should be noted that pixels having a same standard mark value have a same correction constant during adjustment, and correction constants of pixels having different mark values are different. Because of different correction constants, target objects of different object groups present different display effects.

It should further be noted that the correction constant may be a single-dimensional matrix, and a value of each element in the matrix is in a range (0, 1].

For example, a color of a pixel included in the target object is formed by colors of three channels of RGB. If a standard mark value of a pixel is 0.5, and RGB values of the pixel are (58, 110, 165), when $Color_{trans}=(1,0.6,0.6)$, it can be considered that in the RGB channels of the pixel, the R channel keeps an original value, and values of the G and B channels are respectively 0.6 of the original values. Because the R channel represents a red channel, after the processing, the displayed color of the pixel is closer to red.

The foregoing method is not limited to three channels of RGB, and also applies to four channels of CMYK or any number of channels.

It should be noted that in the method according to the foregoing embodiment, when pixel correction is performed on pixels, pixels having a same mark value are corrected by using a same correction constant and by using a standard mark value of each pixel as reference, and pixels having a same standard mark value form an object group. Therefore, a result obtained by means of the foregoing solution is that objects of different object groups present different color casts, so that a user can easily distinguish between different object groups.

It should further be noted that, when an object group does not need a color cast, pixels of objects in the object group may be marked as a special mark value. When pixel correction is performed, pixels having the special mark value are ignored and are not corrected, or pixels of objects that do not need a color cast are corrected by using a correction constant: (1, 1, 1). For example, in the game CrossFire, after corresponding pixel correction is performed on teammates and enemies of the user, the user does not need pixel correction. Therefore, correction on pixels of the user can be avoided by using the foregoing method.

In an embodiment provided in the present disclosure, S206 of separately performing pixel correction on pixels of the target objects included in each object group according to a mark value of each object group includes the following.

S2261: Performing light emitting processing on edge pixels of the target objects included in each object group, where the edge pixels of the target objects having different mark values are corrected to have different light emitting colors.

In an embodiment, when there are only two target objects, one of them may be selected for edge light emitting processing. A plurality of different target objects are distinguished from each other by using different light emitting colors, to distinguish target objects in different object groups.

In an embodiment provided in the present disclosure, after S206 of separately performing pixel correction on pixels of the target objects included in each object group according to a mark value of each object group, the method further includes: performing tone mapping on the pixels of the target objects, where the performing tone mapping on the pixels of the target objects includes the following.

S208: Normalizing the pixels of the target objects, to adjust contrast and/or brightness of the target objects.

After pixel correction, the display effect is that the overall image becomes darker. To further improve the display effect, after pixel correction is completed, tone mapping further needs to be performed on the image, to optimize the image, thereby obtaining a final output render target texture.

In an embodiment, a method for performing tone mapping on an image may be: normalizing each pixel in the image, that is, mapping pixels in the color range (0, ∞] into the color range [0, 1]. After tone mapping, attributes such as the contrast and the brightness of the image can be further optimized.

In an embodiment provided in the present disclosure, before S206 of separately performing pixel correction on pixels of the target objects included in each object group according to a mark value of each object group, the method further includes the following.

S2010: Performing rendering processing on the pixels of the target objects, where the rendering processing includes any one or more of the following: motion blur processing, depth of field processing, or bloom processing.

In an embodiment provided in the present disclosure, S2010 of performing rendering processing on the pixels of the target objects includes the following.

S2011: Performing the motion blur processing, including: performing weighted averaging on pixels in a preset range surrounding a target pixel to obtain a new pixel, and adjusting the target pixel to the new pixel, where the target pixel is a pixel in a movement direction of the target object.

Motion blur is to mainly simulate a blur effect generated by rapid movement or lens movement in a scene, so that a rendered image is closer to an image captured by human eyes or a video camera. A specific method may be obtaining a plurality of pixels in the movement direction of the target object, and performing weighted averaging on pixels surrounding the target pixel to obtain a new pixel value, where the new pixel value is the pixel value of the target pixel.

It should be noted that when values of the pixels surrounding the target pixel have been changed into the new pixel value, during calculation of the new pixel value of the pixel, original pixel values of the surrounding pixels are still used for calculation.

S2023: Performing the depth of field processing, including: performing full screen blur processing on the pixels of the target objects to obtain a result of the full screen blur processing, and mixing the result of the full screen blur processing with the pixels of the target objects.

In the foregoing step, the full screen blur processing is the same as the blur processing in S2011, and the difference is that the full screen blur processing is to perform blur processing on all pixels of the entire display area.

S2025: Performing the bloom processing, including: outputting a blooming part of the target objects into a map, performing blur processing on pixels of the blooming part, and inputting a result of the blur processing into the pixels of the target objects by means of Alpha mixing.

It should be noted that for the foregoing method embodiments, for ease of description, the method embodiments are all described into a series of action combinations. However, a person skilled in the art should know that the present disclosure is not limited by a sequence of described actions because some steps may use other sequences or may be simultaneously performed according to the present disclosure. Secondly, a person skilled in the art should also know that the embodiments described in the specification are all preferred embodiments, and actions and modules involved in the embodiments are not necessarily needed by the present disclosure.

By means of the description of the foregoing implementation, a person skilled in the art can clearly learn that the method according to the foregoing embodiment may be implemented by means of software plus necessary general-purpose hardware platforms, and certainly, may alternatively be implemented by hardware. However, in many cases, the former is a better implementation. Based on such an understanding, the technical solutions of the present disclosure essentially, or the part contributing to the existing technology may be implemented in a form of a software product. The computer software product is stored in a storage medium (such as a read-only memory (ROM)/RAM, a magnetic disk, or an optical disc) and includes several instructions for instructing a terminal device (which may be a mobile phone, a computer, a server, a network device, or the like) to perform the methods described in the embodiments of the present disclosure.

Figure 5:
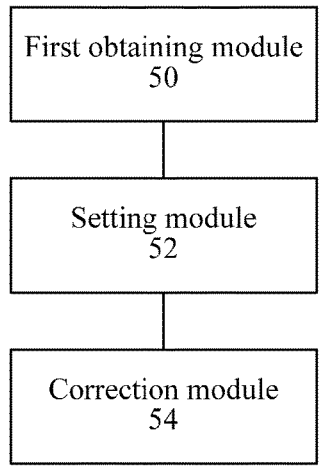
FIG. 5 illustrates a schematic structural diagram of an apparatus for distinguishing objects according to an embodiment of the present application.

According to another embodiment of the present disclosure, an apparatus for performing the foregoing method for distinguishing objects is further provided. FIG. 5 is a schematic structural diagram of an apparatus for distinguishing objects according to an embodiment of the present disclosure. As shown in FIG. 5, the apparatus includes: a first obtaining module 50, a setting module 52, and a correction module 54.

The first obtaining module 50 is configured to obtain a plurality of object groups displayed in an image. Each object group includes at least one target object, and configuration of a same resource for target objects in different object groups is allowed. The setting module 52 is configured to set different mark values for the plurality of object groups. Target objects included in each object group have a same mark value. The correction module 54 is configured to separately perform pixel correction on pixels of the target objects included in each object group according to a mark value of each object group. Pixels of the target objects having different mark values are corrected to have different display attributes.

It should be noted that any one of the object groups includes at least one target object, and different object groups have different mark values, but objects in a same object group have a same mark value. By applying the foregoing method, the technical objective of distinguishing between a plurality of target objects when a same resource is configured for the plurality of target objects can be achieved.

It should further be noted that there may be two object groups that are distinguished from each other by using the method according to the foregoing embodiment, but the number of object groups is not limited thereto, and any number of object groups can be distinguished from each other by using the disclosed method.

It should be noted that the process of pixel correction on the pixels of the target objects is performed in super-post-processing of a post-processing phase in image processing. The rendering efficiency is greatly improved by correcting the pixels in the post-processing. In the present disclosure, performing pixel correction on the pixels of the target objects is added to the super-post-processing phase. With reference to FIG. 3A and FIG. 3B, the rendering time including the time for performing pixel correction on the pixels of the target objects in the present disclosure slightly increases relative to the rendering time in the existing technology, but the increase is not obvious. By using Erg311 (indicating that this image includes 311 objects) as an example, the rendering time is 148.0 us. In the existing technology, the rendering time of Erg312 (indicating that this image includes 312 objects) is 155.0 us. The rendering time in the present disclosure is only 4.7% longer than the rendering time of the existing technology. Therefore, the solution provided in the present disclosure can maintain the original rendering efficiency while achieving the objective of distinguishing objects.

With reference to FIG. 4A and FIG. 4B, it can be seen that the step of pixel correction is added only to the super-post-processing phase of the present disclosure.

In the foregoing steps of this embodiment of the present disclosure, a plurality of object groups displayed in an image are obtained, each object group includes at least one target object, and configuration of a same resource for target objects in different object groups is allowed. Further, different mark values are set for the plurality of object groups, target objects included in each object group having a same mark value, and pixel correction is separately performed on pixels of the target objects included in each object group according to a mark value of each object group, to achieve the technical objective of still being capable of distinguishing objects when a plurality of different object groups use a same resource, thereby achieving the technical effect of improving the resource reusability, and further resolving the technical problem of low resource reusability in the existing technology due to that different resources need to be configured for different target objects in an image to distinguish between the different target objects.

It should be noted that the first obtaining module 50, setting module 52, and correction module 54 may be operated in a computer terminal as a part of the apparatus, and functions implemented by the modules may be executed by a processor in the computer terminal. The computer terminal may alternatively be a terminal device such as a smartphone (such as an Android phone or an iOS phone), a tablet computer, a palmtop computer, a mobile Internet device (MID), or a PAD.

Figure 6:
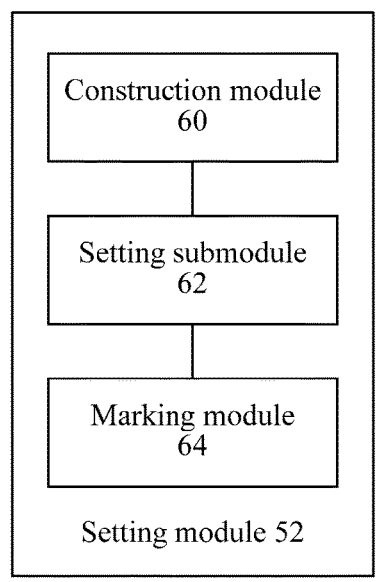
FIG. 6 illustrates a schematic structural diagram of another apparatus for distinguishing objects according to an embodiment of the present application.

In an optional solution according to the foregoing embodiment of the present disclosure, with reference to FIG. 6, the setting module 52 includes: a construction module 60, a setting submodule 62, and a marking module 64.

The construction module 60 is configured to construct a mapping relationship between the plurality of object groups and a plurality of different mark values. The setting submodule 62 is configured to set a corresponding mark value for each object in the plurality of object groups by using the mapping relationship, where the mark value of each object is set to a mark value corresponding to an object group to which each object belongs. The marking module 64 is configured to mark a plurality of pixels included in each object by using the mark value of each object.

It should be noted that the construction module 60, setting submodule 62, and marking module 64 may be operated in a computer terminal as a part of the apparatus, and functions implemented by the modules may be executed by a processor in the computer terminal. The computer terminal may alternatively be a terminal device such as a smartphone (such as an Android phone or an iOS phone), a tablet computer, a palmtop computer, an MID, or a PAD.

Figure 7:
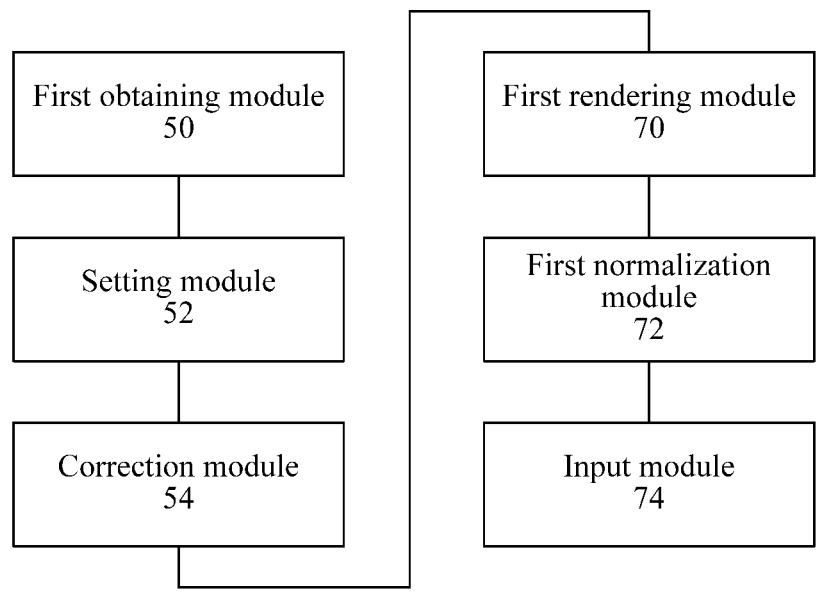
FIG. 7 illustrates a schematic structural diagram of another apparatus for distinguishing objects according to an embodiment of the present application.

In an optional solution according to the foregoing embodiment of the present disclosure, with reference to FIG. 7, the foregoing apparatus further includes: a first rendering module 70, a first normalization module 72, and an input module 74.

The first rendering module 70 is configured to render the target objects into a first render target texture, where the first render target texture has a plurality of channels. The first normalization module 72 is configured to normalize mark values of pixels of the target objects, to obtain standard mark values. The input module 74 is configured to input the standard mark values obtained by means of normalization into a second render target texture, where the second render target texture has a plurality of channels, and the target objects having different mark values are inputted into the plurality of channels of the second render target texture that have different channel values.

For example, the target objects are Black List and Global Risk in CrossFire. The target objects, that is, bodies of the roles, are rendered into a plurality of channels of a first render target texture $RT_0$.

It should be noted that the first render target texture may include three channels of RBG, or may include four channels of CMYK, but the present disclosure is not limited thereto.

It should be noted that the first rendering module 70, first normalization module 72, and input module 74 may be operated in a computer terminal as a part of the apparatus, and functions implemented by the modules may be executed by a processor in the computer terminal. The computer terminal may alternatively be a terminal device such as a smartphone (such as an Android phone or an iOS phone), a tablet computer, a palmtop computer, an MID, or a PAD.

Figure 8:
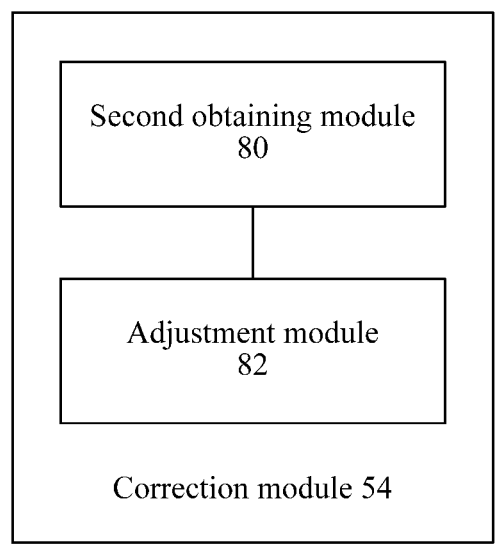
FIG. 8 illustrates a schematic structural diagram of another apparatus for distinguishing objects according to an embodiment of the present application.

In an optional solution according to the foregoing embodiment of the present disclosure, with reference to FIG. 8, the correction module 54 includes: a correction submodule, configured to correct the pixels of the target objects having different mark values into different colors. The correction submodule includes: a second obtaining module 80 and an adjustment module 82. The second obtaining module 80 is configured to obtain the standard mark values corresponding to the pixels of the target objects. The adjustment module 82 is configured to adjust display intensities of a plurality of primary colors that form a color of each pixel in the target objects according to the standard mark values corresponding to the pixels of the target objects, to correct the color of each pixel in the target objects, where pixels of the target objects having a same mark value are corrected into corresponding colors.

In an embodiment, for example, a color of a pixel included in a target object is formed by colors of three channels of RGB, when intensities of the colors of the RGB channels change, the displayed color of the pixel of the target object is changed, so as to change a displayed color of the target object. For example, an RGB value of one pixel of the target object is (58, 110, 165). In this case, the displayed color of the pixel is blue. When the RGB value of the pixel is corrected to be (248, 24, 237), the displayed color of the pixel is corrected to be rose.

It should be noted that colors of target objects having a same mark value are different. Moreover, colors of a plurality of pixels of one target object are also different. Therefore, when pixel correction is performed on pixels of target objects, the pixels of the targets objects are not corrected to have a same RGB value. Instead, RGB values of pixels having a same standard mark value are uniformly adjusted, and the adjustment intensities are the same. To enable the pixels having a same standard mark value to obtain a same adjustment intensity during correction, an adjustment constant needs to be introduced.

It should be noted that the second obtaining module 80 and adjustment module 82 may be operated in a computer terminal as a part of the apparatus, and functions implemented by the modules may be executed by a processor in the computer terminal. The computer terminal may alternatively be a terminal device such as a smartphone (such as an Android phone or an iOS phone), a tablet computer, a palmtop computer, an MID, or a PAD.

Figure 9:
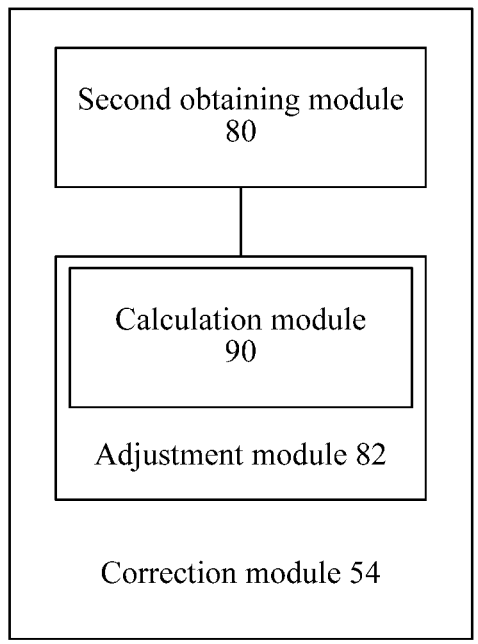
FIG. 9 illustrates a schematic structural diagram of another apparatus for distinguishing objects according to an embodiment of the present application.

In an optional solution according to the foregoing embodiment of the present disclosure, with reference to FIG. 9, the adjustment module 82 includes a calculation module 90.

The calculation module 90 is configured to calculate a corrected pixel color of each pixel in the target objects by using the following formula, $Color_{dest}=Color_{scr}*Color_{trans}$, where $Color_{dest}$ is used to represent the corrected pixel color of a pixel of the target objects, $Color_{scr}$ is used to represent an original pixel color of a pixel of the target objects, $Color_{trans}$ is used to represent a correction constant, and the correction constant is used to adjust the display intensities of the plurality of primary colors that form the color of each pixel in the target objects.

The correction constant is used to represent correction amplitude for correcting a color. It should be noted that pixels having a same standard mark value have a same correction constant during adjustment, and correction constants of pixels having different mark values are different. Because of different correction constants, objects of different object groups present different display effects.

It should further be noted that the correction constant may be a single-dimensional matrix, and a value of each element in the matrix is in a range (0, 1].

For example, a color of a pixel included in the target object is formed by colors of three channels of RGB. If a standard mark value of a pixel is 0.5, and RGB values of the pixel are (58, 110, 165), when $Color_{trans}=(1,0.6,0.6)$, it can be considered that in the RGB channels of the pixel, the R channel keeps an original value, and values of the G and B channels are respectively 0.6 of the original values. Because the R channel represents a red channel, after the processing, the displayed color of the pixel is closer to red.

The foregoing method is not limited to cases of three channels of RGB, and also applies to cases of four channels of CMYK or another number of channels.

It should be noted that in the method according to the foregoing embodiment, when pixel correction is performed on pixels, pixels having a same mark value are corrected by using a same correction constant and by using a standard mark value of each pixel as reference, and pixels having a same standard mark value form an object group. Therefore, a result obtained by means of the foregoing solution is that objects of different object groups present different color casts, so that a user can easily distinguish between different object groups.

It should further be noted that when an object group does not need a color cast, pixels of objects in the object group may be marked as a special mark value. When pixel correction is performed, pixels having the special mark value are ignored and are not corrected, or pixels of objects that do not need a color cast are corrected by using a correction constant: (1, 1, 1). For example, in the game CrossFire, after corresponding pixel correction is performed on teammates and enemies of the user, the user does not need pixel correction. Therefore, correction on pixels of the user can be avoided by using the foregoing method.

It should be noted that the calculation module 90 may be operated in a computer terminal as a part of the apparatus, and a function implemented by the module may be executed by a processor in the computer terminal. The computer terminal may alternatively be a terminal device such as a smartphone (such as an Android phone or an iOS phone), a tablet computer, a palmtop computer, an MID, or a PAD.

Figure 10:
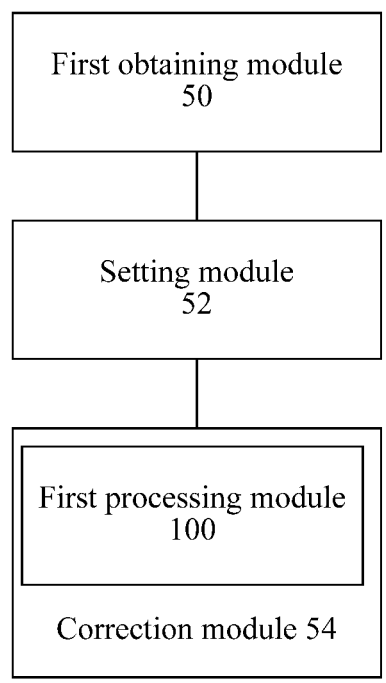
FIG. 10 illustrates a schematic structural diagram of another apparatus for distinguishing objects according to an embodiment of the present application.

In an optional solution according to the foregoing embodiment of the present disclosure, with reference to FIG. 10, the correction module 54 includes a first processing module 100, which is configured to perform light emitting processing on edge pixels of the target objects included in each object group, where the edge pixels of the target objects having different mark values are corrected to have different light emitting colors.

Figure 11:
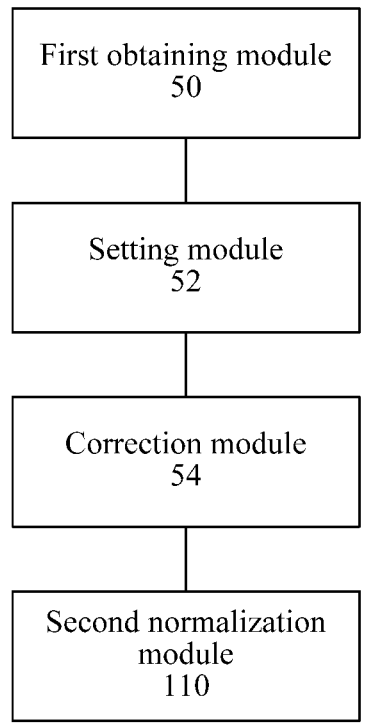
FIG. 11 illustrates a schematic structural diagram of another apparatus for distinguishing objects according to an embodiment of the present application.

In an optional solution according to the foregoing embodiment of the present disclosure, with reference to FIG. 11, the foregoing apparatus further includes a mapping module, which is configured to perform tone mapping on the pixels of the target objects, where the mapping module includes: a second normalization module 110, configured to normalize the pixels of the target objects, to adjust contrast and/or brightness of the target objects.

After pixel correction, the display effect is that the overall image becomes darker. To further improve the display effect, after pixel correction is completed, tone mapping further needs to be performed on the image, to optimize the image, thereby obtaining a final output render target texture.

It should be noted that the first processing module 100 may be operated in a computer terminal as a part of the apparatus, and a function implemented by the module may be executed by a processor in the computer terminal. The computer terminal may alternatively be a terminal device such as a smartphone (such as an Android phone or an iOS phone), a tablet computer, a palmtop computer, an MID, or a PAD.

Figure 12:
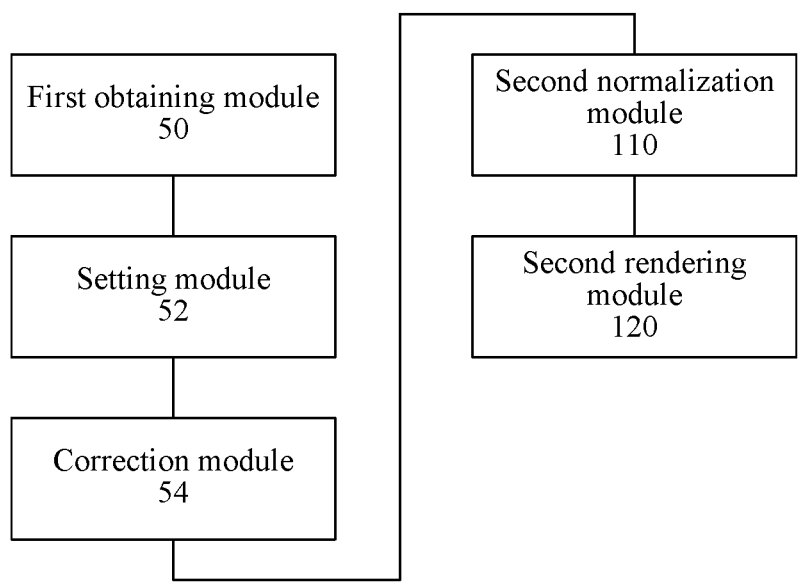
FIG. 12 illustrates a schematic structural diagram of another apparatus for distinguishing objects according to an embodiment of the present application.

In an optional solution according to the foregoing embodiment of the present disclosure, with reference to FIG. 12, the foregoing apparatus further includes a second rendering module 120, which is configured to perform rendering processing on the pixels of the target objects, where the rendering processing includes any one or more of motion blur processing, depth of field processing, or bloom processing.

It should be noted that the second rendering module 120 may be operated in a computer terminal as a part of the apparatus, and a function implemented by the module may be executed by a processor in the computer terminal. The computer terminal may alternatively be a terminal device such as a smartphone (such as an Android phone or an iOS phone), a tablet computer, a palmtop computer, an MID, or a PAD.

Figure 13:
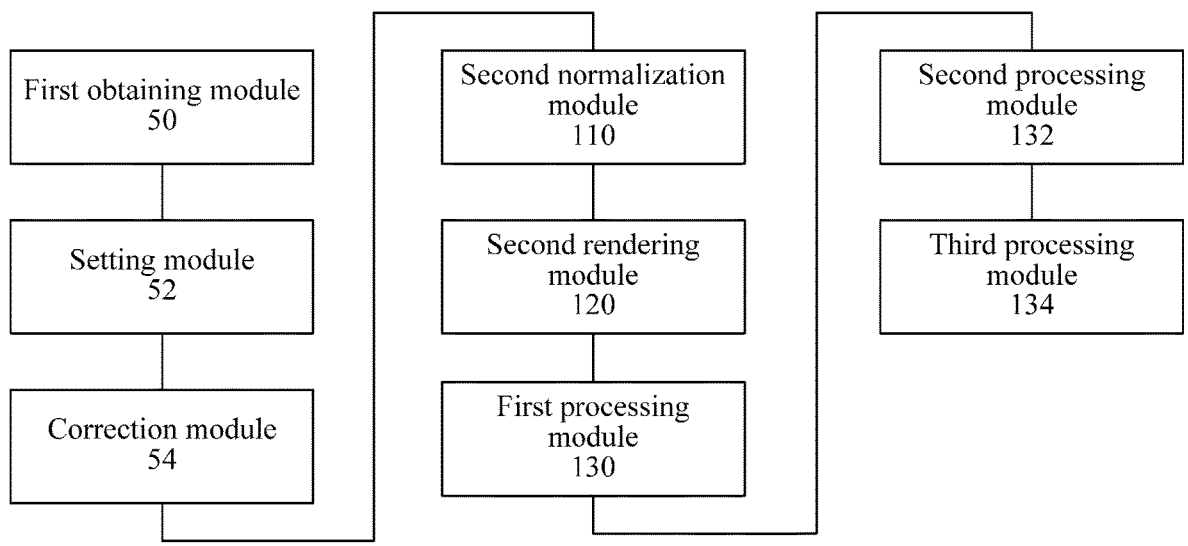
FIG. 13 illustrates a schematic structural diagram of another apparatus for distinguishing objects according to an embodiment of the present application.

In an optional solution according to the foregoing embodiment of the present disclosure, with reference to FIG. 13, the foregoing apparatus further includes: a first processing module 130, a second processing module 132, and a third processing module 134.

The first processing module 130 is configured to perform the motion blur processing, including: performing weighted averaging on pixels in a preset range surrounding a target pixel to obtain a new pixel, and adjusting the target pixel to the new pixel, where the target pixel is a pixel in a movement direction of the target object.

The second processing module 132 is configured to perform the depth of field processing, including: performing full screen blur processing on the pixels of the target objects to obtain a result of the full screen blur processing, and mixing the result of the full screen blur processing with the pixels of the target objects.

The third processing module 134 is configured to perform the bloom processing, including: outputting a blooming part of the target objects into a map, performing blur processing on pixels of the blooming part, and inputting a result of the blur processing into the pixels of the target objects by means of Alpha mixing.

It should be noted that the first processing module 130, second processing module 132, and third processing module 134 may be operated in a computer terminal as a part of the apparatus, and functions implemented by the modules may be executed by a processor in the computer terminal. The computer terminal may alternatively be a terminal device such as a smartphone (such as an Android phone or an iOS phone), a tablet computer, a palmtop computer, an MID, or a PAD.

The functional modules according to this embodiment of the present disclosure may be operated in a mobile terminal, a computer terminal, or a similar computing apparatus, or may be stored as a part of a storage medium.

Therefore, an embodiment of the present disclosure may provide a computer terminal, which may be any computer terminal device in a computer terminal group. Optionally, in this embodiment, the foregoing computer terminal may alternatively be replaced with a terminal device such as a mobile terminal.

Optionally, in one embodiment, the foregoing computer terminal may be at least one network device of a plurality of network devices located in a computer network.

In this embodiment, the foregoing computer terminal may execute program codes of the following steps in a method for distinguishing objects: obtaining a plurality of object groups displayed in an image, each object group including at least one target object, and configuration of a same resource for target objects in different object groups being allowed; setting different mark values for the plurality of object groups, target objects included in each object group having a same mark value; and separately performing pixel correction on pixels of the target objects included in each object group according to a mark value of each object group, pixels of the target objects having different mark values being corrected to have different display attributes.

Optionally, the computer terminal may include: one or more processors, a memory, and a transmission apparatus. The memory may be configured to store a software program and module, for example, program instructions/modules corresponding to the method and apparatus for distinguishing objects. The processor runs the software program and module stored in the memory, to implement various functional applications and data processing, that is, implement the foregoing method for extracting text of a web page. The memory may include a high-speed RAM, and may also include a nonvolatile memory such as one or more magnetic storage devices, flash memories, or other nonvolatile solid-state memories. In some examples, the memory may further include memories remotely disposed relative to the processor, and these remote memories may be connected to the terminal through a network. Examples of the network include, but not limited to, the Internet, an intranet, a local area network, a mobile communications network, and a combination thereof.

The foregoing transmission apparatus is configured to receive or send data through a network. A specific example of the network may include a wired network and a wireless network. In an example, the transmission apparatus includes an NIC, which may be connected to another network device and a router through a network cable to communicate with the Internet or a local area network. In an example, the transmission apparatus is an RF module, which is configured to communicate with the Internet in a wireless manner.

The processor may call, by using the transmission apparatus, the information and the application program that are stored in the memory, to execute program codes of method steps in each optional or preferred embodiment of the foregoing method embodiments.

A person of ordinary skill in the art may understand that, the computer terminal may alternatively be a terminal device such as a smartphone (such as an Android phone or an iOS phone), a tablet computer, a palmtop computer, an MID, or a PAD.

A person of ordinary skill in the art may understand that all or some of the steps of the methods of the foregoing embodiments may be implemented by a program instructing relevant hardware of the terminal device. The program may be stored in a computer readable storage medium. The storage medium may be a flash disk, a ROM, a RAM, a magnetic disk, an optical disc, or the like.

Figure 14:
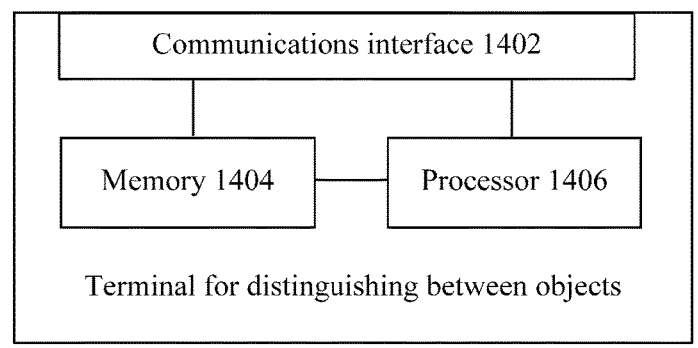
FIG. 14 illustrates a schematic diagram of a terminal for distinguishing objects according to an embodiment of the present application.

According to another embodiment of the present disclosure, a server or a terminal for performing the foregoing method for distinguishing objects is further provided. As shown in FIG. 14, the server or terminal includes: a communications interface 1402, a memory 1404, and a processor 1406.

The communications interface 1402 is configured to obtain a plurality of object groups displayed in an image, and the memory 1404 is connected to the communications interface 1402 and configured to store the obtained plurality of object groups displayed in the image.

The processor 1406 is connected to the communications interface 1402 and the memory 1404, and configured to: obtain the plurality of object groups displayed in the image, each object group including at least one target object, and configuration of a same resource for target objects in different object groups being allowed; set different mark values for the plurality of object groups, target objects included in each object group having a same mark value; and separately perform pixel correction on pixels of the target objects included in each object group according to a mark value of each object group, pixels of the target objects having different mark values being corrected to have different display attributes.

Optionally, reference may be made to examples previously described for specific examples in this embodiment, and details are not described herein again.

An embodiment of the present disclosure further provides a storage medium. Optionally, in this embodiment, the foregoing storage medium may be configured to store program codes executed by the method for distinguishing objects according to the foregoing method embodiment and apparatus embodiment.

Optionally, in this embodiment, the foregoing storage medium may be located in any computer terminal in a computer terminal group in a computer network, or in any mobile terminal of a mobile terminal group. The storage medium is configured to store program codes for performing the following method.

S1: Obtaining a plurality of object groups displayed in an image, where each object group includes at least one target object, and a same resource may be configured for target objects in different object groups.

S2: Setting different mark values for the plurality of object groups, target objects included in a same object group having a same mark value.

S3: Separately performing pixel correction on pixels of the target objects included in each object group according to a mark value of each object group, pixels of the target objects having different mark values being corrected to have different display attributes.

Optionally, the storage medium is further configured to store program codes for performing the following: constructing a mapping relationship between the plurality of object groups and a plurality of different mark values; setting a corresponding mark value for each object in the plurality of object groups by using the mapping relationship, where the mark value of each object is set to a mark value corresponding to an object group to which each object belongs; and marking a plurality of pixels included in each object by using the mark value of each object.

Optionally, the storage medium is further configured to store program codes for performing the following steps: rendering the target objects into a first render target texture, where the render target texture has a plurality of channels; normalizing mark values of pixels of the target objects, to obtain standard mark values; and inputting the standard mark values obtained by means of normalization into a second render target texture, where the second render target texture has a plurality of channels, and the different standard mark values are inputted into the plurality of channels of the second render target texture that have different channel values.

Optionally, the storage medium is further configured to store program codes for performing the following steps: obtaining the standard mark values corresponding to the pixels of the target objects; and adjusting display intensities of a plurality of primary colors that form a color of each pixel in the target objects according to the standard mark values corresponding to the pixels of the target objects, to correct the color of each pixel in the target objects, where pixels of the target objects having a same mark value are corrected into corresponding colors.

Optionally, the storage medium is further configured to store a program code for performing the following step: calculating a corrected pixel color of each pixel in the target objects by using the following formula $Color_{dest}=Color_{scr}*Color_{trans}$, where $Color_{dest}$ is used to represent the corrected pixel color of a pixel of the target objects, $Color_{scr}$ is used to represent an original pixel color of a pixel of the target objects, $Color_{trans}$ is used to represent a correction constant, and the correction constant is used to adjust the display intensities of the plurality of primary colors that form the color of each pixel in the target objects.

Optionally, the storage medium is further configured to store a program code for performing the following step: performing light emitting processing on edge pixels of the target objects included in each object group, where the edge pixels of the target objects having different mark values are corrected to have different light emitting colors.

Optionally, the storage medium is further configured to store a program code for performing the following step: normalizing the pixels of the target objects, to adjust contrast and/or brightness of the target objects.

Optionally, the storage medium is further configured to store a program code for performing the following step: performing rendering processing on the pixels of the target objects, where the rendering processing includes any one or more of the following: motion blur processing, depth of field processing, or bloom processing.

Optionally, the storage medium is further configured to store program codes for performing the following steps: performing the motion blur processing, including: performing weighted averaging on pixels in a preset range surrounding a target pixel to obtain a new pixel, and adjusting the target pixel to the new pixel, where the target pixel is a pixel in a movement direction of the target object; performing the depth of field processing, including: performing full screen blur processing on the pixels of the target objects to obtain a result of the full screen blur processing, and mixing the result of the full screen blur processing with the pixels of the target objects; and performing the bloom processing, including: outputting a blooming part of the target objects into a map, performing blur processing on pixels of the blooming part, and inputting a result of the blur processing into the pixels of the target objects by means of Alpha mixing.

Optionally, in this embodiment, the foregoing storage medium may include, but not limited to: various media that can store program codes such as a USB flash drive, a ROM, a RAM, a removable hard disk, a magnetic disk, or an optical disc.

The method and apparatus for distinguishing objects according to the present disclosure are exemplarily described above with reference to the accompanying drawings. However, a person skilled in the art should understand that various improvements may further be made to the method and apparatus for distinguishing objects provided in the foregoing disclosure without departing from the content of the present disclosure. Therefore, the protection scope of the present disclosure should be determined by the content of the appended claims.

When integrated units in the foregoing embodiments are implemented in a form of a software functional module and sold or used as an independent product, the units may be stored in the foregoing computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, each embodiment is described with a focus. Reference may be made to related descriptions of other embodiments for a part that is not described in detail in an embodiment.

In the several embodiments provided in the present disclosure, it should be understood that the disclosed client may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The units described as separate parts may or may not be physically separate, and the parts displayed as units may or may not be physical units, may be located at one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

The foregoing descriptions are merely preferred implementations of present disclosure. It should be pointed out that a person of ordinary skill in the art may further make several improvements and modifications without departing from the principle of the present disclosure. The improvements and modifications should further be considered to fall within the protection scope of the present disclosure.

What is claimed is:

1. A method for distinguishing objects, comprising:
   identifying in an image a first object group including first target objects and a second object group including second target objects;
   constructing a mapping relationship including a first connection correlating the first object group with a first mark value and a second connection correlating the second object group to a second mark value different than the first mark value;
   according to the mapping relationship, assigning the first mark value to each of the first target objects in the first group, and assigning the second mark value to each of the second target objects in the second group;
   marking pixels in the first target objects using the first mark value and marking pixels in the second target objects using the second mark value;
   performing pixel correction on the pixels of the first target objects according to the first mark value to obtain first display attributes and performing pixel correction on the pixels of the second target objects according to the second mark value to obtain second display attributes different than the first display attributes;
   rendering the first and second target objects into a first render target texture, wherein the first render target texture has a first plurality of channels;
   normalizing first and second mark values of pixels of the first and second target objects, to obtain first and second standard mark values; and
   inputting the first and second standard mark values obtained by normalization into a second render target texture, wherein the second render target texture has a second plurality of channels, and the first and second standard mark values are inputted into the second plurality of channels having different channel values.

2. The method according to claim 1, further comprising:

adjusting display intensities of a plurality of primary colors that form a color of each of the pixels in the first and second target objects according to the first and second standard mark values corresponding to the pixels of the first and second target objects, to correct the color of each of the pixels in the first and second target objects.

3. The method according to claim 2, further comprising:
obtaining a corrected pixel color of each of the pixels in the first and second target objects according to: $Color_{dest}=Color_{scr}*Color_{trans}$, wherein $Color_{dest}$ represents the corrected pixel color, $Color_{scr}$ represents an original pixel color of one of the pixels of the first and second target objects, and $Color_{trans}$ represents a correction constant to adjust the display intensities of the plurality of primary colors that form the color of each of the pixels in the first and second target objects.

4. The method according to claim 1, further comprising:
performing light emitting processing on edge pixels of the first and second target object.

5. The method according to claim 1, further comprising:
performing tone mapping on the pixels of the first and second target objects, including: normalizing the pixels of the first and second target objects, to adjust contrast and/or brightness of the first and second target objects.

6. The method according to claim 1, further comprising:
performing rendering processing on the pixels of the first and second target objects, including any one or more of motion blur processing, depth of field processing, or bloom processing.

7. The method according to claim 6, wherein the performing rendering processing on the pixels of the first and second target objects comprises:
performing the motion blur processing, including: performing weighted averaging on pixels in a preset range surrounding a target pixel to obtain a new pixel, and adjusting the target pixel to the new pixel, wherein the target pixel is a pixel in a movement direction of the first and second target object;
performing the depth of field processing, including: performing full screen blur processing on the pixels of the first and second target objects to obtain a result of the full screen blur processing, and mixing the result of the full screen blur processing with the pixels of the first and second target objects; and
performing the bloom processing, including: outputting a blooming part of the first and second target objects into a map, performing blur processing on pixels of the blooming part, and inputting a result of the blur processing into the pixels of the first and second target objects by Alpha mixing.

8. A non-transitory computer-readable storage medium, comprising: computer-executable instructions, upon being executed by one or more processors, to cause the one or more processors to perform:
identifying in an image a first object group including first target objects and a second object group including second target objects;
constructing a mapping relationship including a first connection correlating the first object group with a first mark value and a second connection correlating the second object group to a second mark value different than the first mark value;
according to the mapping relationship, assigning the first mark value to each of the first target objects in the first group, and assigning the second mark value to each of the second target objects in the second group;
marking pixels in the first target objects using the first mark value and marking pixels in the second target objects using the second mark value;
performing pixel correction on the pixels of the first target objects according to the first mark value to obtain first display attributes and performing pixel correction on the pixels of the second target objects according to the second mark value to obtain second display attributes different than the first display attributes;
rendering the first and second target objects into a first render target texture, wherein the first render target texture has a first plurality of channels;
normalizing first and second mark values of pixels of the first and second target objects, to obtain first and second standard mark values; and
inputting the first and second standard mark values obtained by normalization into a second render target texture, wherein the second render target texture has a second plurality of channels, and the first and second standard mark values are inputted into the second plurality of channels having different channel values.

9. The non-transitory computer-readable storage medium according to claim 8, wherein the computer-executable instructions cause the one or more processors to further perform:
adjusting display intensities of a plurality of primary colors that form a color of each of the pixels in the first and second target objects according to the first and second standard mark values corresponding to the pixels of the first and second target objects, to correct the color of each of the pixels in the first and second target objects.

10. The non-transitory computer-readable storage medium according to claim 9, wherein the computer-executable instructions cause the one or more processors to further perform:
obtaining a corrected pixel color of each of the pixels in the first and second target objects according to: $Color_{dest}=Color_{scr}*Color_{trans}$, wherein $Color_{dest}$ represents the corrected pixel color, $Color_{scr}$ represents an original pixel color of one of the pixels of the first and second target objects, and $Color_{trans}$ represents a correction constant to adjust the display intensities of the plurality of primary colors that form the color of each of the pixels in the first and second target objects.

11. The non-transitory computer-readable storage medium according to claim 8, wherein the computer-executable instructions cause the one or more processors to further perform:
performing light emitting processing on edge pixels of the first and second target objects.

12. The non-transitory computer-readable storage medium according to claim 8, wherein the computer-executable instructions cause the one or more processors to further perform:
performing tone mapping on the pixels of the first and second target objects, including: normalizing the pixels of the first and second target objects, to adjust contrast and/or brightness of the first and second target objects.

13. The non-transitory computer-readable storage medium according to claim 8, wherein the computer-executable instructions cause the one or more processors to further perform:
performing rendering processing on the pixels of the first and second target objects, including any one or more of motion blur processing, depth of field processing, or bloom processing.

14. The non-transitory computer-readable storage medium according to claim 13, wherein the performing rendering processing on the pixels of the first and second target objects comprises:
- performing the motion blur processing, including: performing weighted averaging on pixels in a preset range surrounding a target pixel to obtain a new pixel, and adjusting the target pixel to the new pixel, wherein the target pixel is a pixel in a movement direction of the first and second target object;
- performing the depth of field processing, including: performing full screen blur processing on the pixels of the first and second target objects to obtain a result of the full screen blur processing, and mixing the result of the full screen blur processing with the pixels of the first and second target objects; and
- performing the bloom processing, including: outputting a blooming part of the first and second target objects into a map, performing blur processing on pixels of the blooming part, and inputting a result of the blur processing into the pixels of the first and second target objects by Alpha mixing.

* * * * *